United States Patent [19]

Allard et al.

[11] Patent Number: 4,852,348
[45] Date of Patent: Aug. 1, 1989

[54] FUEL INJECTION SYSTEM FOR RAMJET ENGINE

[75] Inventors: Pierre Allard, Antony; Robert Lefebvre, Chatillon; Daniel Vallee, Montrouge; Pierre Berton, Boulogne, all of France

[73] Assignee: Aerospatiale Societe Nationale Industrielle, Paris, France

[21] Appl. No.: 210,198

[22] Filed: Jun. 20, 1988

Related U.S. Application Data

[63] Continuation of Ser. No. 937,827, Dec. 4, 1986, abandoned.

[30] Foreign Application Priority Data

Dec. 13, 1985 [FR] France ................................ 85 18513

[51] Int. Cl.$^4$ ............................................... F02K 7/10
[52] U.S. Cl. ...................................... 60/270.1; 60/746
[58] Field of Search ..................... 60/270.1, 733, 734, 60/740, 746, 747, 739, 742

[56] References Cited

U.S. PATENT DOCUMENTS 2,636,553 4/1953 Ballantyne et al. ................... 60/742
2,716,329 8/1955 Lunger ............................... 60/270.1
3,020,717 2/1962 Pearce ................................ 60/270.1
3,379,009 4/1968 Sharp et al. ........................ 60/270.1
4,499,735 2/1985 Moore et al. ......................... 60/739
4,539,811 9/1985 Dale et al. ......................... 60/270.1

Primary Examiner—Louis J. Casaregola
Attorney, Agent, or Firm—Marshall, O'Toole, Gerstein, Murray & Bicknell

[57] ABSTRACT

This invention relates to a fuel injection system for a ramjet engine of the type comprising a swirling combustion chamber, wherein said system comprises:

at least one first injector arranged in the inner part of the corresponding air duct to send, in common with said first injectors of the other individual injection devices, fuel into a common zone of said combustion chamber adjacent said closed end and peripherally defined by said air ducts; as well as at least one second injector arranged in the outer part of the corresponding air duct, to send fuel into a specific zone of said combustion chamber located near the wall thereof, downstream of the opening of the corresponding air duct. The invention is more particularly applicable to the propulsion of missiles.

5 Claims, 4 Drawing Sheets

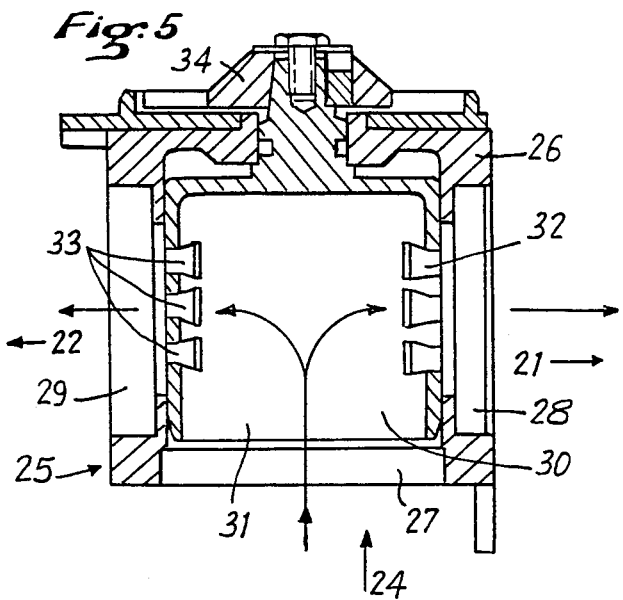
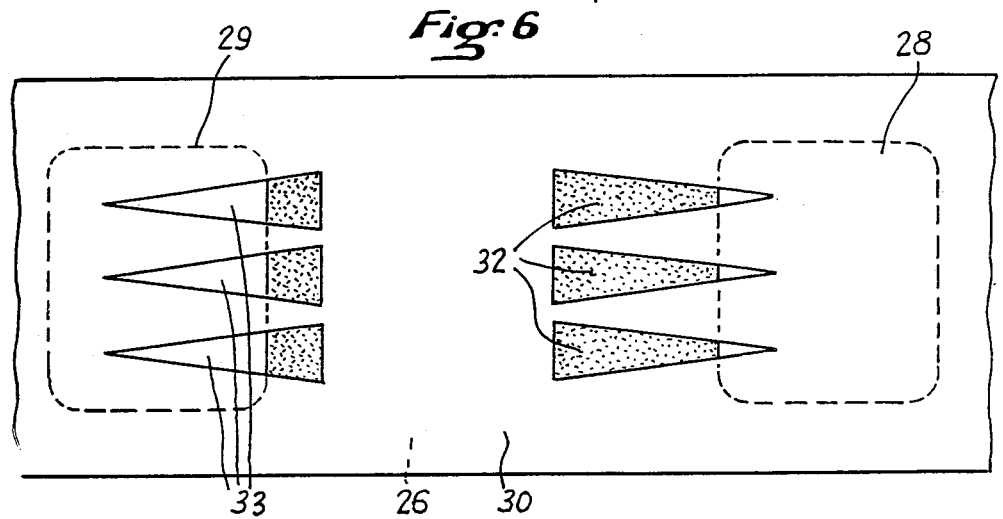
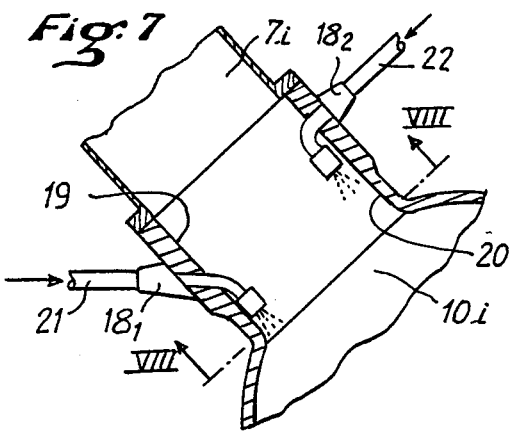
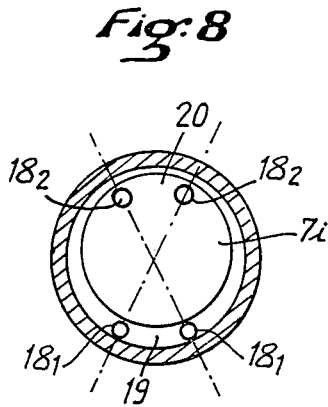

FUEL INJECTION SYSTEM FOR RAMJET ENGINE

This application is a continuation of application Ser No. 937,827, filed Dec. 4, 1986, abandoned.

The present invention relates to a system for injecting fuel, liquid or gaseous, for ramjet engines. It also relates to the ramjet engines provided with such an injection system, as well as to the missiles propelled by such ramjet engines.

Modern ramjet engines, particularly intended for propelling missiles, are known to comprise a combustion chamber, at the inlets of which the jets of carburetted air are separated in order to maintain combustion. Such a combustion chamber, qualified as "swirling", presents the advantage of being shorter than a non-swirling combustion chamber and of not necessitating, contrary to the latter, internal flameholder elements to stabilize and maintain combustion in continuous regime.

A swirling combustion chamber is advantageous, on the one hand because it is shorter and, on the other hand, because the absence of flameholder allows a fuel grain to be positioned within said chamber, for ensuring acceleration of the missile up to cruising speed, the ramjet engine then taking over to propel the missile. This results in an appreciable saving of volume and weight for the missile.

In this type of ramjet engine, air ducts are provided, which open out on the periphery or in the front bottom of the chamber, ensuring capture of the air and opening in the centre of the combustion chamber at a high angle with respect to the longitudinal axis. Such a configuration creates highly swirling gaseous flows in the chamber, with zones of apparent quasi-stagnation.

However, due to the necessity of having the ramjet engine operate in various modes of fuel richness, at different speeds and at different altitudes, it is observed, on the one hand, that the efficiency of combustion of the ramjet engine is variable and that, on the other hand, certain vibratory modes of combustion appear in part of the speed-altitude-richness range of the missile.

Certain of these vibrations are detrimental to the resistance of the thermal protection of the combustion chamber and to that of certain equipment of the missile.

For example, in these modern ramjet engines, low-frequency vibrations (some hundreds of Hz), which are tolerable if their intensity is low, are encountered, and high-frequency vibrations (from 1000 to some thousands of Hz), whose most detrimental effect is to cause the rapid destruction of the internal thermal protections of the chamber.

Consequently, the principal object of the present invention is to ensure a high-performance operation of the engine of a missile incorporating a ramjet engine, avoiding the appearance and maintenance of the vibratory modes associated with combustion and detrimental to the integrity of the components (in particular to that of the internal thermal protection of the combustion chamber), whatever the conditions of speed and altitude of the flight, as well as of the level of thrust required.

To this end, according to the invention, the fuel injection system for a ramjet engine of the type comprising a swirling combustion chamber which opens outwardly via a nozzle and into which open out, obliquely with respect to the axis of said combustion chamber and on the periphery of the closed end thereof opposite said nozzle, a plurality of air capture ducts of which at least certain are equipped with an individual fuel injection device, close to the opening of the corresponding air duct in said combustion chamber, is noteworthy: —in that each individual fuel injection device comprises:

at least one first injector arranged in the inner part of the corresponding air duct to send, in common with said first injectors of the other individual injection devices, fuel into a common zone of said combustion chamber adjacent said closed end and peripherally defined by the openings of said air ducts; as well as at least one second injector arranged in the outer part of the corresponding air duct, to send fuel into a specific zone of said combustion chamber located near the wall thereof, downstream of the opening of the corresponding air duct;

—and in that, at each instant, the sum of the individual flowrates of fuel injected by said first and second injectors, respectively into said common zone and in the plurality of said specific zones, corresponds to the richness of fuel necessitated by the desired operation of said ramjet engine.

In this way, according to the invention, the injection of fuel is permanently controlled and, from a judicious location of the points of injection, the amplitude of the flowrate of fuel is modulated at each of the points, the total flowrate corresponding to the conditions of thrust and of richness envisaged. Optimum operation of the combustion chamber of a ramjet engine is therefore obtained, without detrimental vibrations, by effecting a permanent controlled sharing of the flowrate of fuel between several locations of injectors, determined as a function of the phenomena of combustion, the distribution of flowrate depending on the evolution of the richness and of the pressure in the combustion chamber.

In fact, Applicants have found by experience that the mode of carburetting of the centre of the combustion chamber was determinant in the control of the vibrations of combustion. They were thus able to define conditions of fuel injection varying as a function of the richness of fuel, of the speed and altitude of flight of the missile, which make it possible to eliminate or very substantially reduce the detrimental vibrations of combustion, but also which allow operation with a satisfactory efficiency of combustion in the whole range in question.

Furthermore, experience has shown that only two distinct locations of injection were sufficient to ensure the optimum conditions mentioned above. One of these locations, referred to hereinabove as common zone, is constituted by the volume of the front part, generally in the form of a spherical dome, of the combustion chamber, whilst the other is formed by the assembly of the zones, referred to hereinabove as specific zones, disposed on the periphery of said chamber downstream of the openings of said air ducts. In general, the number of specific zones is equal to that of said air ducts.

The solution brought by the invention to the problem set forth hereinabove thus consists:

in injecting the fuel at two distinct locations in which mixture with air and combustion takes place;

in adapting the proportion of fuel injected respectively at the two locations as a function of the principal operational parameters of the combustion chamber, such as: richness of fuel, altitude at which the missile flies, and Mach number at which the missile flies.

All the first injectors may advantageously be supplied in common with fuel via a single distribution circuit, and the same applies to all the second injectors.

The injection system according to the invention may comprise a valve for regulating the overall fuel flowrate to be sent to said combustion chamber and a valve for distributing this overall flow between said distribution circuits respectively supplying said first and second injectors.

Said regulating and distributing valves are preferably controlled by a computer.

In an advantageous embodiment, the flow distribution valve comprises a single fuel inlet and two outlets of variable aperture, the aperture of one of said outlets increasing when that of the other outlet decreases, and vice versa.

The present invention also relates to a ramjet engine comprising such an injection system, and to a missile equipped with this ramjet engine.

The invention will be more readily understood on reading the following description with reference to the accompanying drawings, in which:

FIG. 1 schematically shows, in longitudinal section, a missile equipped with a ramjet engine of known type to which the invention is applied.

FIG. 2 schematically illustrates the injection system according to the invention.

FIG. 5 shows in axial section an embodiment of a fuel distributor between the first and second injectors.

FIG. 6 is a developed view of the fuel distributor of FIG. 5.

FIG. 7 schematically shows, in axial section, an example of implantation of injectors in an air duct.

FIG. 8 is a schematic section along line VIII—VIII of FIG. 7.

Figure 1:
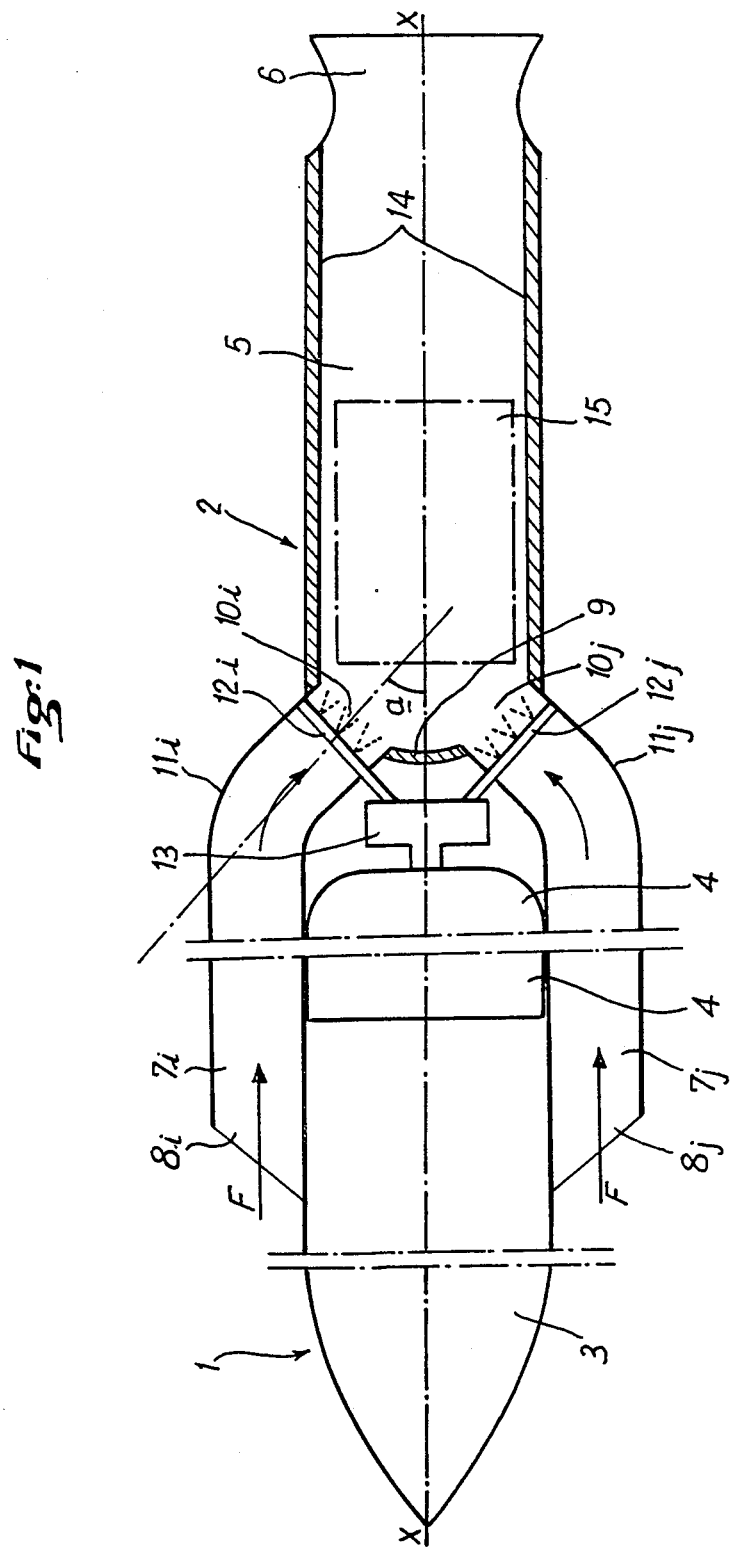

Referring now to the drawings, FIG. 1 shows a missile 1 propelled by a ramjet engine 2 of known type concerned by the present invention.

Missile 1 comprises a body 3 containing, inter alia, the conventional apparatus and loads (which are not shown as they are not involved by the invention), a fuel tank 4 for supplying the ramjet engine 2, fixed to the rear part of said body 3.

The ramjet engine 2 is constituted by a combustion chamber 5 terminating at the rear by an exhaust nozzle 6 and connected, towards the front, to a plurality of n air ducts $7_1$, $7_2$, ... $7_i$, $7_j$, ... $7_n$. In FIG. 1, only air ducts $7_i$ and $7_j$ are visible. The number n may for example be equal to 4.

Air ducts $7_i$ (with $1 \leq i \leq n$) are disposed on the periphery of the body 3 and they are fast therewith. Each of them, towards the front, comprises a corresponding air inlet $8_i$ and, towards the rear, opens out into the front part 9 of the combustion chamber 5 via a corresponding opening $10_1$.

Said front part 9 of the combustion chamber 5 is preferably at least substantially spherical.

A bend $11_i$ is provided in each air duct $7_i$ to connect that part of the latter fixed to the outer wall of the body 3 to the corresponding opening $10_i$ of the combustion chamber 5, with the result that each air duct $7_i$ opens out at a high angle a with respect to axis X—X of missile 1 and of ramjet engine 2.

In each air duct $7_i$ there is provided, in the vicinity of the corresponding opening $10_i$ a fuel injection device $12_i$. The individual devices $12_i$ are controlled by a fuel supply and regulating device 13 borne by the body 3 and connected to tank 4.

A thermal protection coating 14 is preferably provided on the inner walls of the combustion chamber 5.

Missile 1 operates as follows:

Initially, ramjet engine 2 not being in operation, missile 1 is moved by a consumable propulsion unit 15 (for example a solid propellant charge) housed inside the combustion chamber 5. When the propulsion unit 15 is in operation, the air ducts are obturated at the inlet into chamber 5 and an accelerator nozzle (not shown) smaller than that of the ramjet engine is in position at the outlet of the chamber. At the end of operation of the propulsion unit 15, the accelerator nozzle and the air inlet obturators are ejected and the air penetrates (arrows F) into the air ducts $7_i$ through openings $8_i$ and is conducted into combustion chamber 5.

At the end of operation of the consumable propulsion unit 15, device 13 supplies the injection devices $12_i$ with fuel and the latter is ignited. The ramjet engine then comes into operation and takes over from the propulsion unit 15 (which has disappeared) to propel missile 1.

Figure 2:
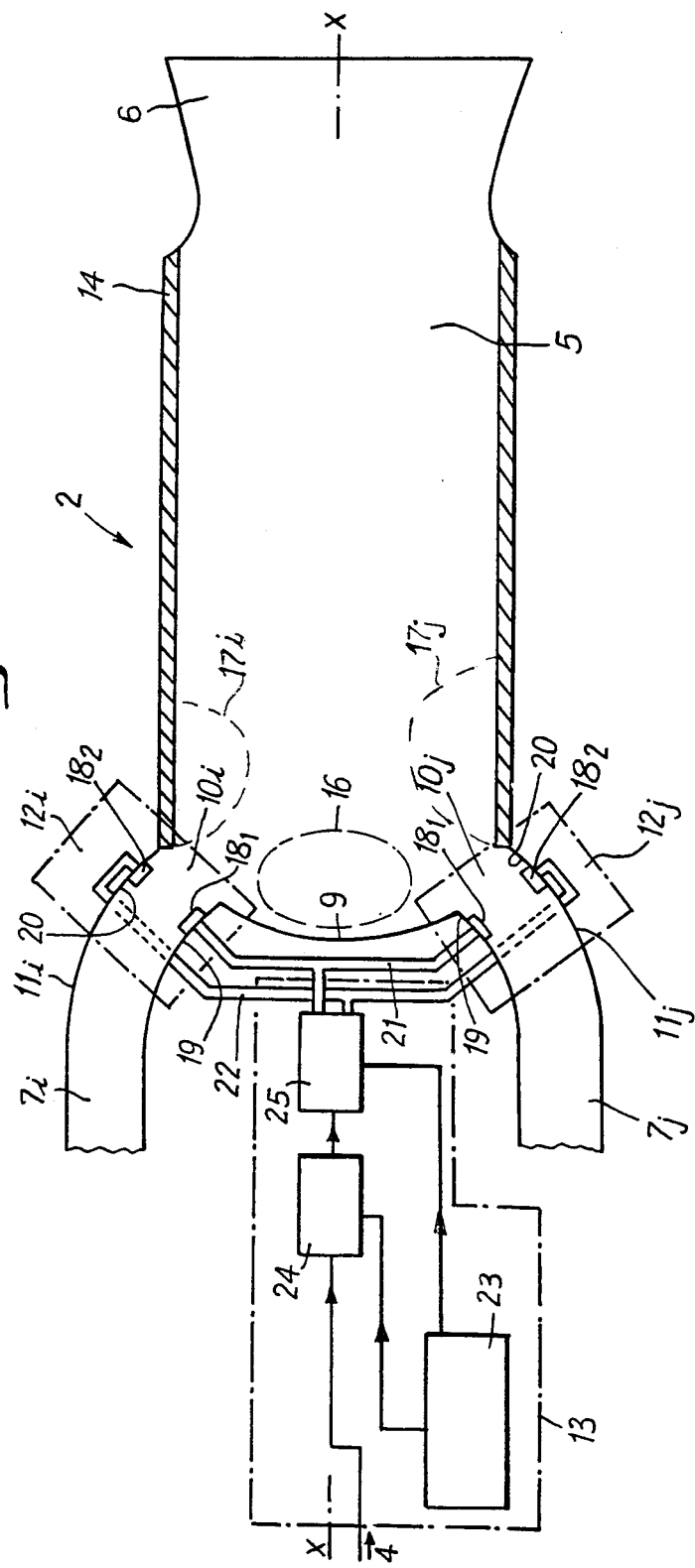

As schematically illustrated in FIG. 2, an aerodynamic study of the swirling chamber 5 incorporating a plurality of air inlets, during operation of the ramjet engine 2, has revealed the presence in the combustion chamber 5 of two types of characteristic, so-called recirculation zones, in which stabilization of the flames is promoted by the relative stagnation of the gaseous flows. These are essentially:

zone 16, opposite nozzle 16 and defined between the spherical front part 9 and the openings $10_i$ of the air capture ducts $7_i$;

a plurality n of zones $17_i$, each corresponding to an air duct $7_i$ and located near the wall of the combustion chamber 5, downstream of the corresponding opening $10_i$.

Applicants have found that the regime and performances of combustion chamber ramjet engine 2 are linked with the fuel of zones 16 and $17_1$ to $17_n$.

Consequently, a separate carburetting between said zones is provided according to the invention.

As may be seen in FIG. 2, each individual fuel injection device $12_i$ comprises:

at least one first injector $18_1$ arranged in the inner part 19 (inner curvature of bend $11_i$) of the corresponding air duct $7_i$, this inner part 19 representing that portion of inner wall of said air duct close to opening $10_i$ and to axis X—X;

at least one second injector $18_2$ arranged in the outer part 20 (outer curvature of bend $11_i$) of the corresponding air duct $7_i$, this outer part 20 representing that portion of inner wall of said air duct close to opening $10_i$, but remote from axis X—X.

All the first injectors $18_1$ are arranged to send, in common, fuel into zone 16, whilst each of the second injectors $18_2$ is arranged to send fuel into its specific zone $17_i$.

The first injectors $18_1$ are supplied in common with fuel by device 13, via a distribution circuit 21. Similarly the second injectors $18_2$ are supplied in common with fuel by device 13, via a distribution circuit 22.

The quantity of fuel introduced at each instant into combustion chamber 5 must, of course, correspond to the richness appropriate for the performances demanded of ramjet engine 2 at that moment as a function of the flight of missile 1 (acceleration, Mach number, altitude, turn, rise, descent, etc...).

The supply and regulation device 13 of the system according to the invention comprises a computer 23, a valve 24 for regulating the overall flow of fuel and a valve 25 for distributing this overall flow between the first injectors $18_1$ and the second injectors $18_2$ respectively via circuits 21 and 22. Computer 23 determines at each instant, as a function of the performances demanded of the ramjet engine 2, the positions of valves 24 and 25, i.e. the overall fuel flowrate to be sent to the combustion chamber 5 and the distribution of this overall flow between zone 16 and zones $17_i$.

In order to explain operation of the system according to the invention, the following references are given hereinafter:

R designates the richness of fuel supplied to combustion chamber 5 by device 13; this richness R is defined as being the ratio $$R = \frac{f}{fs},$$

f itself being the ratio:

$$\frac{\text{quantity of fuel admitted into chamber 5 per second}}{\text{quantity of air admitted into chamber 5 per second}},$$

fs being the value of f for a stoichiometric air-fuel mixture.

Mc, the efficiency of combustion of combustion chamber 5; and d, the ratio at a given instant between the total quantity of fuel injected by the second injectors $18_2$ and the total quantity of fuel injected by said first injectors $18_1$.

Figure 3:
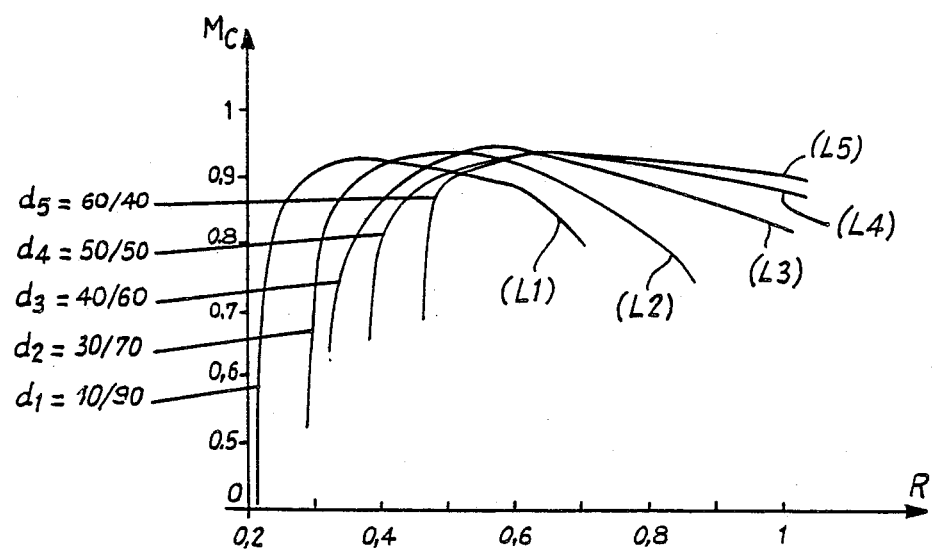
FIG. 3 is a diagram showing the variations in efficiency of the ramjet engine as a function of the richness of fuel and of the distribution of the fuel between the first and second injectors.

If, for a determined constant value of ratio d, the variation of the efficiency of combustion Mc is plotted as a function of richness R, a curve (L) is obtained, presenting an increasing ascending branch and a decreasing descending branch joined by a maximum. Consequently, if the variation of the efficiency of combustion Mc is plotted is a function of the richness R for a plurality of determined constant values d1, d2, d3, d4, d5, ... of ratio d, a family of curves (L1), (L2), (L3), (L4), (L5), ... is obtained, as shown in FIG. 3. This Figure shows that the curves (L) are offset towards the increasing values of R as d takes a higher value, but that the maximum values of Mc are substantially the same for all of said curves. In other words, the maximum value of Mc corresponds to a richness R all the greater as ratio d is higher.

Figure 4:
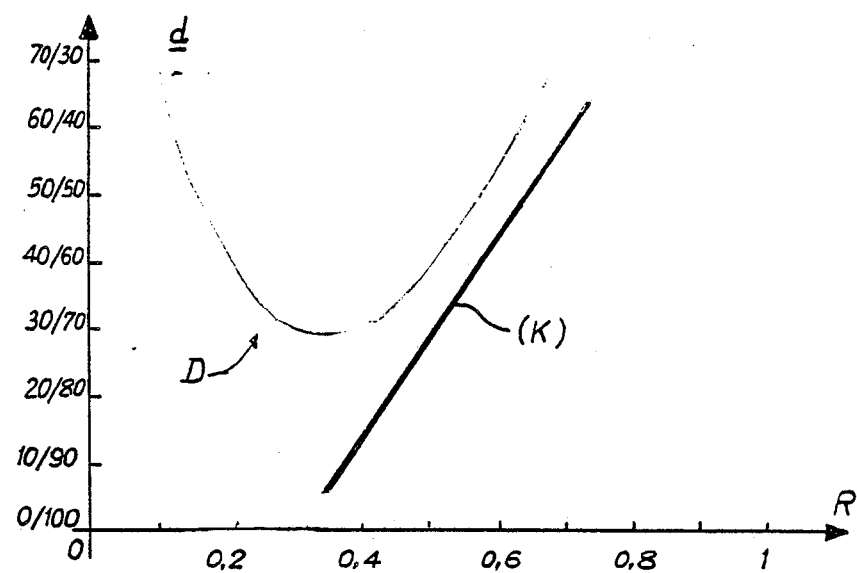
FIG. 4 is a diagram showing the range of the vibrations as a function of the richness of fuel and of the distribution of the fuel between the first and second injectors.

Furthermore, if, in a system of coordinates representing R on the x-axis and -d on the y-axis, it is sought to represent the range (D) of vibratory operation of the ramjet engine 2, the scheme of FIG. 4 is for example obtained.

A comparison of the diagrams of FIGS. 3 and 4 shows that, if computer 23 controls valves 24 and 25 so that the injection of fuel into combustion chamber 5 follows a law such as that bearing reference (K) in FIG. 4, ramjet engine 2 will operate with good efficiency and without vibration.

Consequently, computer 23 comprises in memory one or more curves (K) which have been determined by experience and thanks to which it controls valves 24 and 25 in optimal manner, as far as operation of ramjet engine 2 is concerned.

FIGS. 5 and 6 show an embodiment of the valve 25 for distributing the overall fuel flow, delivered by the regulation valve 24 (which may be of any known type).

In this embodiment, the distribution valve 25 comprises a cylindrical casing 26 provided with an axial inlet 27 and two lateral outlet windows 28 and 29. Inlet 27 is connected to the outlet of the regulation valve 24, whilst the lateral outlet windows 28 and 29 are respectively connected to circuits 21 and 22, supplying the first and second injectors $18_1$ and $18_2$.

Inside the cylindrical casing 26 there is rotatably mounted, about the axis thereof, a cylindrical key 30 provided with an inlet 31 (in register with axial inlet 27) and with lateral slots 32 and 33 of which the position opposite windows 28 and 29 respectively depends on the angular position of the key 30 with respect to the casing 26. Lateral slots 32 and lateral slots 33 are, for example, triangular in form (cf. FIG. 6).

Slots 32 and 33 are arranged so that, on the one hand, they are partly opposite windows 28 and 29 (white parts in FIG. 6) and partly obturated by the wall of casing 26 (tinted parts in FIG. 6) and that, on the other hand, when the obturated part of slots 32 (or 33) increases further to the rotation of key 30 with respect to casing 26, the obturated part of slots 33 (or 32) decreases in the same proportion. In this way, the sections of passage of valve 25 towards circuit 21 and towards circuit 22 varies inversely. The triangular form of slots 32 and 33 ensures linearity of the ratio of flow as a function of the angle of rotation of key 30. As a function of the angular position of said key 30, the distribution of the overall flow received from valve 24, between the first injectors $18_1$ and second injectors $18_2$ may therefore be known at each instant. An actuator (not shown), such as for example an electro-mechanical jack, is provided to control rotation of key 30, via a drive ring 34.

FIGS. 7 and 8 schematically illustrate an embodiment of the injection devices $12_i$, in which two first injectors $18_1$ and two second injectors $18_2$ have been provided. The number of injectors may, of course, be different. The important point is that, taking into account the gaseous flows circulating in the air ducts $7_i$. the first injectors $18_1$ supply zone 16 and that the second injectors $18_2$ supply zones $17_i$.

Thanks to the invention, modern combustion chambers for a missile incorporating a liquid-fuel ramjet engine are improved by modulating the fuel flowrate between two or more locations of injectors, as a function of the energetic and vibratory characteristics resulting from combustion in the chamber.

Consequently:

(a) the efficiency of combustion may be maintained at an optimum value;

(b) the starting and maintenance of vibratory regimes detrimental to the structure (in particular to the thermal protections in the chamber) and to the equipment, is avoided;

(c) endurance and reliability of the missile are increased.

What is claimed is:

1. A ramjet engine comprising a combustion chamber which does not contain any flameholders and which opens outwardly via a nozzle and into which open out, obliquely with respect to the axis of said combustion chamber and on the periphery of the closed end thereof opposite said nozzle, a plurality of air capture ducts of which at least certain are equipped with an individual fuel injection device, close to the opening of the corresponding air duct in said combustion chamber, said plurality of air capture ducts each being inclined to the centerline or said combustion chamber at an angle sufficiently great to insure that combustion within said chamber is swirling, in such a way that said chamber has a first recirculation zone, opposite said nozzle and defined between said closed end of the combustion chamber and said openings of said air capture ducts, and a plurality of second recirculation zones, each located near the wall of said combustion chamber, downstream of each of said openings, wherein each individual fuel injection device comprises:
at least one first injector arranged in the inner part of the corresponding air duct, for supplying said first recirculation zone with fuel;
at least one second injector arranged in the outer part of the corresponding air duct, for supplying the corresponding second recirculation zone with fuel;
said engine further comprising:
first supply means for supplying said first injectors in common with fuel;
second supply means for supplying said second injectors in common with fuel; and
distribution means for controlling and dividing the overall flow of fuel to said combustion chamber between said first and second supply means.

2. The injection system of claim 1 wherein said distribution means comprises a first valve for regulating said overall flow of fuel to be sent to said combustion chamber and a second valve for distributing said overall flow between said first and second supply means respectively supplying said first and second injectors.

3. The injection system of claim 2, further comprising a computer controlling said first and second valves.

4. The injection system of claim 2, wherein said second flow distribution valve comprises a single fuel inlet and two outlets of variable aperture, the aperture of one of said outlets increasing when that of the other outlet decreases, and vice versa.

5. A missile propelled by a ramjet engine in accordance with claim 1.

* * * * *